Patented July 16, 1946

2,403,939

UNITED STATES PATENT OFFICE 2,403,939

PROCESS FOR TREATMENT OF DOLOMITE AND HIGH-CALCIC LIMESTONES

Walter H. MacIntire, Knoxville, Tenn., assignor to American Zinc, Lead & Smelting Company, St. Louis, Mo., a corporation of Maine No Drawing. Application May 31, 1944, Serial No. 538,207

11 Claims. (Cl. 23—134)

This invention pertains to a process by which magnesium oxide is obtained from dolomite or dolomitic limestone, duly calcined, with concomitant recovery of the calcium component of the calcine as either calcium pentasulfide, calcium chloride, or calcium carbonate; and particularly is a process in which a solution of elemental sulfur in ammonium hydroxide is used as the agency for the selective dissolution of CaO from a calcine containing that oxide and MgO. The process is also applicable to high calcic limestones for the production of calcium pentasulfide, into which combination the sulfur of the added ammonium sulfide solution is completely converted.

I am aware of the fact that sulfuric acid has been used to accomplish the dissolution of the magnesium carbonate content of raw dolomite with resultant by-product carbon dioxide gas and waste calcium sulfate; that hydrogen sulfide gas has been used for the selective dissolution of magnesium hydroxide from an aqueous suspension of dolomite calcined selectively to a composition of $CaCO_3$ and MgO, as set forth in U. S. Patent No. 2,118,353, in which case the ready reactivity of the hydrogen sulfide toward MgO and inertia toward calcium carbonate are implemented; and that hydrogen sulfide has been used to effect the dissolution of the lime (CaO) component of a completely calcined dolomite to the exclusion of similar dissolvent action upon the magnesia (MgO) component as set forth by Murray U. S. Patent No. 2,317,396. I am also aware that elemental sulfur has been utilized to separate the calcic and magnesic oxide components of a completely calcined dolomite, as set forth in the Drewsen Patent No. 1,628,311, by which, however, the sulfur was not fully and effectively utilized inasmuch as one-sixth of it was lost in the undesired form of calcium thiosulfate ($CaS_2O_3$). Such a procedure, characterized by the same wastefulness of sulfur through the formation of the undesired thiosulfate, is also disclosed in British Patent No. 536,-670/1942.

The primary objective of the present invention is to effect the complete reaction of the added sulfur and its full recovery in the form of calcium pentasulfide ($CaS_5$) through complete inhibition of the formation of calcium thiosulfate, a salt that results in waste of a substantial part of the starting sulfur and which has no known usage. Further, the thiosulfate is not only responsible for the incomplete recovery of the starting sulfur in the desired form of calcium pentasulfide but is also a diluent and an obstruction in the processing of the generated pentasulfide solution to a desired concentration or in the obtaining of the solid pentasulfide ($CaS_5$) or in the recovery of dissolved calcium in the forms of salts and sulfur as such from the solution of the pentasulfide.

The initial step in my process when applied to dolomite is to calcine the dolomite to a composition of lime (CaO) and magnesia (MgO). Such calcination can be effectuated by any suitable method that assures the calcination of dolomite to its component oxides without "over-burning," although I prefer to burn the dolomite at a temperature of approximately 700° C. in an atmosphere of steam to assure a lime component of unusual reactivity, as set forth in my Patent No. 2,212,446.

The calcine is then suspended in an aqueous solution of ammonium sulfide, which is a solute of elemental sulfur in an ammoniacal solution resultant from the injection of hydrogen sulfide ($H_2S$) into a suspension of elemental sulfur in an aqueous solution of ammonia. This ammoniacal solution of sulfur may be prepared directly or obtained as a by-product from industrial operations. One part of the dolomitic calcine to twelve to fifteen parts of the ammonium sulfide solution by weight is preferred. Empirical determination has established the desirability of this ratio of calcine to solution, but since this proportion can be varied somewhat for specific adaptations I do not limit myself thereto.

The "milk of dolomitic lime" solution-suspension in the ammoniacal sulfide system thus provided is boiled in a closed container and is kept in a state of agitation at approximately 100° C. This is done conveniently and preferably by the passage of a current of steam to expedite reaction between the hydrated calcium oxide, $Ca(OH)_2$, of the dolomitic calcine and the additive solution of sulfur, with which the hydrated lime reacts to form the soluble calcium pentasulfide. This effectuates a dissolution of the calcium hydroxide by the ammonium sulfide with concomitant and expeditious liberation of the ammonia, which is recovered for cyclic operation, as indicated by the equation $$Ca(OH)_2 + (NH_4)_2S_5 \rightarrow CaS_5 + 2NH_3 + 2H_2O + \text{heat } NH_3 \rightarrow$$ 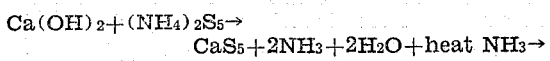

At the end of the reaction period of forty-five minutes or less the boiled and ammonia-freed solution of calcium pentasulfide ($CaS_5$) is filtered from the undissolved magnesia (MgO), which is partly in the hydrated form ($Mg(OH)_2$). The filtrate of pentasulfide (CaS₅) can be concentrated, or the solute can be brought to solid phase by evaporation and then constitutes, in both phases, the valuable economic spray product available for appropriate dilution and usage as a fungicide particularly adapted to the control of the San Jose scale and other orchard handicaps.

As noted, dissolution of the calcium oxide of the dolomitic calcine is conducted preferably with requisite agitation in a closed system in which air has been replaced by steam, and which system is heated either internally or externally. Further, it is advantageous to use a fresh hot calcine and thus conserve both stored heat and heat of CaO hydration in the chamber in which the ammoniacal solution of sulfur is brought into reaction with the dolomitic calcine solution-suspension.

Empirical determination has established the necessity for boiling the ammoniacal polysulfide solution containing the calcine until complete removal of ammonia is effectuated. It has been found desirable to expedite the removal of the liberated ammonia by the passage of a current of steam through the boiling system. The prescribed step of boiling in a closed system precludes any oxidation of the dissolved sulfur.

The present process effectuates the complete removal of the calcium oxide component of the starting dolomitic calcine and full utilization of the added sulfur, the cost of which is compensated for by its complete conversion into a highly desirable commercial fungicide; and with concomitant recovery of the magnesia of that calcine.

If desired, the sulfur of the pentasulfide can be recovered as elemental sulfur through addition of muriatic acid, HCl, as indicated by the equation $CaS_5 + 2HCl = 4S + H_2S + CaCl_2$. Also the calcium of the chloride solution filtered from the elemental sulfur liberated by the HCl can be recovered as calcium carbonate ($CaCO_3$) by the injection of carbon dioxide ($CO_2$) and ammonia into the filtrate from the precipitated sulfur, as indicated by the equation $$CaCl_2 + 2NH_3 + CO_2 + H_2O \rightarrow CaCO_3 + 2NH_4Cl$$

The magnesia obtained as a residue from the filtration of the calcium pentasulfide from the processed lime-freed calcine is comprised of MgO and Mg(OH)₂, the last mentioned being in preponderance at a ratio of about 4 to 1. When lightly calcined to dispel water of hydration this residue gives a magnesia (MgO) of relatively high concentration, or purity; and, when derived from a good grade of dolomite, is of quality superior to that of the magnesia obtained from sea water.

As heretofore noted one part of the dolomitic calcine to twelve to fifteen parts of the ammonium sulfide solution by weight is preferred. When the process is used with high grade calcic limestone, however, I prefer a ratio of one part of calcine to 20 to 30 parts of solution by weight inasmuch as such a high-calcic limestone might contain as much as 99 per cent of $CaCO_3$.

When used on high-calcic limestones the chief objective of my ammonium sulfide process is to attain full reaction and recovery of the additive sulfur in the form of calcium pentasulfide (CaS₅), in either solute or solid phase. The process could be directed also to the attainment of either calcium chloride or carbonate of high purity through the stipulated processing of the polysulfide solution.

What is claimed is:

1. The process of making a separation of the calcium and magnesium components of a dolomitic calcine in the form of calcium pentasulfide and magnesium oxide which comprises calcining the dolomite to its constituent oxides of calcium and magnesium, suspending the calcine in an aqueous solution of ammonium sulfide, boiling the suspension in a closed system until the ammonia is liberated completely, filtering and concentrating the solution of the calcium pentasulfide, and gently calcining the filtered magnesic residuum.

2. The process of making a separation of the calcium and magnesium components of a dolomitic calcine in the form of calcium pentasulfide and magnesium oxide which comprises calcining the dolomite to its constituent oxides of calcium and magnesium, suspending the calcine in an aqueous solution of ammonium sulfide, boiling the suspension in a closed steam-swept system until the ammonia is liberated completely, filtering and concentrating the solution of the calcium pentasulfide, and gently calcining the filtered magnesic residuum.

3. The process of making a separation of the calcium and magnesium components of a dolomitic calcine in the form of calcium pentasulfide and magnesium oxide which comprises calcining the dolomite to its constituent oxides of calcium and magnesium, suspending the calcine in an aqueous solution of ammonium sulfide in the proximate proportion of one part of calcine to twelve to fifteen parts of solution by weight, boiling the suspension in a closed system for forty-five minutes or less until the ammonia is liberated completely, filtering and concentrating the calcium pentasulfide solution, and gently calcining the filtered magnesic residuum.

4. The process of treating limestone which comprises calcining the limestone, suspending the calcine in an aqueous solution of ammonium sulfide, boiling the suspension in a closed system until the ammonia is liberated completely, filtering and concentrating the calcium pentasulfide solution, treating the calcium pentasulfide filtrate with muriatic acid and recovering the sulfur liberated in elemental form and the calcium as chloride.

5. The process of treating a limestone which comprises calcining the limestone, suspending the calcine in an aqueous solution of ammonium sulfide, boiling the suspension in a closed system until the ammonia is liberated, filtering and concentrating the calcium pentasulfide solution, treating the calcium pentasulfide solution with muriatic acid (HCl) and recovering the sulfur liberated in elemental form and the calcium as chloride, and treating the calcium chloride (CaCl₂) solution by injecting carbon dioxide and ammonia and recovering calcium carbonate (CaCO₃) and ammonium chloride (NH₄Cl).

6. The process of making calcium pentasulfide from limestone which comprises calcining the limestone, suspending the calcine in an aqueous solution of ammonium sulfide, boiling the suspension in a closed system until the ammonia is liberted completely, and filtering and concentrating the solution of the calcium pentasulfide.

7. The process of making calcium pentasulfide from limestone which comprises calcining the limestone, suspending the calcine in an aqueous solution of ammonium sulfide, boiling the suspension in a closed steam-swept system until the ammonia is liberated completely, and filtering and concentrating the solution of the calcium pentasulfide.

8. The process of making calcium pentasulfide from a high-calcic limestone which comprises calcining the limestone, suspending the calcine in an aqueous solution of ammonium sulfide in the proximate proportion of one part of calcine to twenty to thirty parts of solution by weight, boiling the suspension in a closed system until the ammonia is liberated completely, and filtering and concentrating the solution of the calcium pentasulfide.

9. The process of making calcium pentasulfide from a high-calcic limestone which comprises calcining the limestone, suspending the calcine in an aqueous solution of ammonium sulfide in the proximate proportion of one part of calcine to twenty to thirty parts of solution by weight, boiling the suspension in a closed steam-swept system until the ammonia is liberated completely, and filtering and concentrating the solution of the calcium pentasulfide.

10. The process of making calcium pentasulfide from limestone which comprises calcining the limestone, suspending the calcine in an aqueous solution of ammonium sulfide, boiling the suspension in a closed system until the ammonia is liberated completely, and filtering and evaporating the solution to secure solid calcium pentasulfide.

11. The process of making calcium pentasulfide from a high-calcic limestone which comprises calcining the limestone, suspending the calcine in an aqueous solution of ammonium sulfide in the proximate proportion of one part of calcine to twenty to thirty parts of solution by weight, boiling the suspension in a closed system until the ammonia is liberated completely, and filtering and evaporating the solution to secure solid calcium pentasulfide.

WALTER H. MacINTIRE.